United States Patent
Tani

Patent Number: 6,021,103
Date of Patent: Feb. 1, 2000

[54] DEVICE FOR RECORDING TO AN OPTICAL DISK BY USING A TRACK DESCRIPTOR BLOCK ON THE OPTICAL DISK

[75] Inventor: Takao Tani, Osaka, Japan

[73] Assignee: Funai Techno-Systems Co., Ltd., Daito, Japan

[21] Appl. No.: 09/158,097

[22] Filed: Sep. 22, 1998

[30] Foreign Application Priority Data

Sep. 24, 1997 [JP] Japan ................ 9-009025 U

[51] Int. Cl.[7] ................................................. G11B 3/90
[52] U.S. Cl. .................................. 369/58; 369/275.3
[58] Field of Search ........................ 369/275.3, 275.2, 369/58, 54, 32

[56] References Cited

U.S. PATENT DOCUMENTS

| | | | |
|---|---|---|---|
| 5,325,352 | 6/1994 | Matsumoto | 369/275.1 |
| 5,559,778 | 9/1996 | Inokuchi et al. | 369/58 |
| 5,617,384 | 4/1997 | Yonemitsu et al. | 369/32 |
| 5,623,470 | 4/1997 | Asthana et al. | 369/58 |
| 5,721,856 | 2/1998 | Takeuchi | 369/32 |

FOREIGN PATENT DOCUMENTS 8-22689   1/1996   Japan .

*Primary Examiner*—Tan Dinh
*Attorney, Agent, or Firm*—Morgan, Lewis & Bockius LLP

[57] ABSTRACT

An optical disk device having a TDB read section for reading a write method indicated by a track descriptor block positioned on the outermost peripheral side of an optical disk that has been mounted when power is supplied or the optical disk is replaced, and a TDB storage section for storing the write method read by the TDB read section. When data is instructed to be written to the optical disk, the data is written to the optical disk when the write method thus instructed conforms to the write method stored in the TDB storage section.

4 Claims, 3 Drawing Sheets

DEVICE FOR RECORDING TO AN OPTICAL DISK BY USING A TRACK DESCRIPTOR BLOCK ON THE OPTICAL DISK

BACKGROUND OF THE INVENTION

1. Field of the Invention

The present invention relates to an optical disk device for writing data to a optical disk on which a track descriptor block indicating how to write data has been recorded in a pregap portion of its track head portion.

2. Description of the Related Art

In the case of such a writable optical disk as a write once optical disk, data recorded after the recording of data is interrupted can be incorporated with data recorded before the interruption of the data recording in order to record the whole data in one complete track. On the other hand, there are methods of writing data to tracks: a track-at-once method and a packet-write method. The packet-write method is further divided into a fixed length method and a variable length method; in other words, there are three methods of writing data onto tracks. Notwithstanding, the same write method has to be employed in the same track. When the recording of data is interrupted once and then restarted subsequently, the method of writing data continuously has to conform to the method of writing data that has been employed before such an interruption occurs. For this reason, it is necessary to make certain of whether the write method conforms to the write method employed before that interruption whenever data is continuously written to a track where the write operation has temporarily been interrupted.

On the other hand, the method of writing data is indicated in a track descriptor block (hereinafter referred to as "TDB"), which is recorded in a pregap portion provided in the head portion of a track. When data is written continuously after the write operation is interrupted, it is necessary to make certain of whether the write method conforms to what has been indicated in the TDB by reading the latter method prior to performing the write operation. However, it takes about 500 mS to perform the operation of reading the write method recorded in the TDB. Therefore, when data is written according to instructions from the outside, there are required two kinds of time, namely, the time required to read the write method indicated in the TDB and the time required to write data actually and this results in lowering the write speed when viewed from the outside.

On the other hand, the conventional technique proposed in Japanese Patent Unexamined Publication No. Hei. 8-22689 is intended to shorten write time and prevent overwriting by finding each track mode in advance. In this conventional technique, the number of tracks N is obtained according to PMA information. Whether a track 1 has been written is then checked and the data mode of the track 1 is determined by its written condition. In other words, the data mode is determined to be MODE 1 when no data has been written to the track 1. Further, the data mode is determined to be MODE 1 or MODE 2 by its written condition when data has been written to the track 1. Subsequently, the length of the pregap portion disposed in the head portion of each track is repeatedly examined until the number of tracks reaches N. When the length of the pregap portion thus examined is two seconds or more, the data mode of the track is determined to be identical to the data mode of a preceding track. Further, when the length of the pregap portion thus examined is three seconds or more, the data mode of the track is determined to be different from the data mode of a preceding track. Consequently, the data modes of all tracks are determined on the basis of the data mode of the track 1 thus examined first and stored.

However, the following problems develop from the above conventional technique. That is, there is required time to read the length of the pregap portion in addition to time until a pickup is moved to the pregap portion in order to read the length of the pregap portion of one track. Moreover, the number of tracks may sometimes reach maximum 100. Therefore, it takes an extremely long time to completely determine the data modes of all tracks. For this reason, it also takes a long time until commands become acceptable when the optical disk has been replaced and this makes the optical disk device not easy to use.

SUMMARY OF THE INVENTION

The present invention is intended to solve the foregoing problems and an object thereof is to provide an optical disk device capable of shortening the time required for initial setting when write speed is prevented from lowering as viewed from outside the optical disk device by reading and storing beforehand a write method indicated in a TDB which is positioned on the outermost periphery when power is supplied or when an optical disk is replaced.

In order to achieve the above object, according to the present invention, there is provided an optical disk device for writing data to an optical disk having a pregap portion disposed in a head portion of a track to which a track descriptor block indicating a method of writing data to the track is recorded, the optical disk device comprising: a TDB read section for reading a write method indicated by a track descriptor block positioned on an outermost peripheral side of the optical disk thus mounted when power is supplied or the optical disk is replaced; and a TDB storage section for storing the write method read by the TDB read section, wherein when data is instructed to be written to the optical disk, it is checked whether the write method thus instructed conforms to the write method stored in the TDB storage section, and wherein data is written to the optical disk when both write methods conform to each other and no data is written to the optical disk when both write methods do not conform to each other.

That is, the TDB read section reads the write method indicated by the track descriptor block positioned on the outermost peripheral side of the optical disk thus mounted and sends out the write method thus read to the TDB storage section. In other words, it is required to read only one pregap portion and consequently read time is shortened. When data is written, moreover, the data is written when the instructed write method conforms to the write method stored in the TDB storage section, whereby the track descriptor block need not be read at the time of writing data.

DETAILED DESCRIPTION OF THE PREFERRED EMBODIMENT

An embodiment of the invention will subsequently be described with reference to the accompanying drawings.

Figure 1:
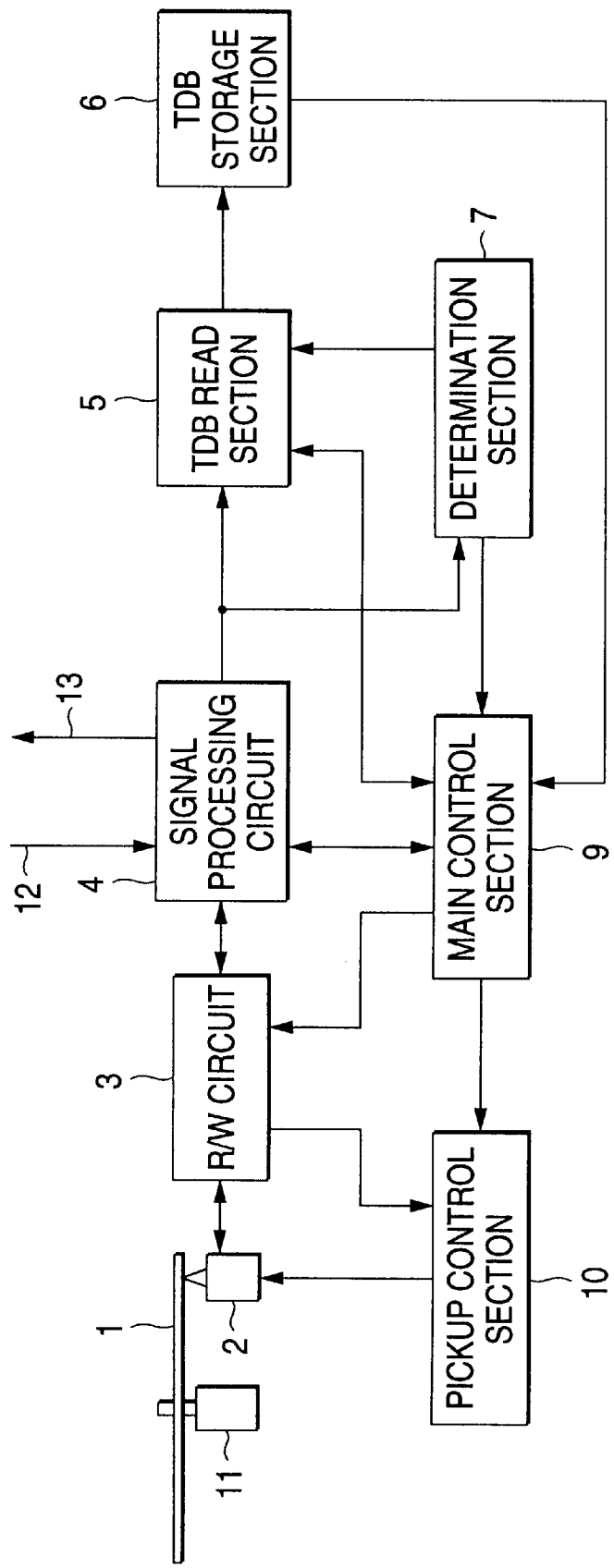
FIG. 1 is a block diagram illustrating an electrical arrangement of an optical disk device embodying the invention.

FIG. 1 is a block diagram illustrating an electrical arrangement of an optical disk device according to the embodiment.

As shown in FIG. 1, an optical disk 1 is used for writing data along a spiral track and more specifically in the form of a CD-R or a CD-RW. In this embodiment, data is also read from a CD-ROM to which no data is written. Therefore, the optical disk 1 m nay be a CD-ROM.

Figure 2:
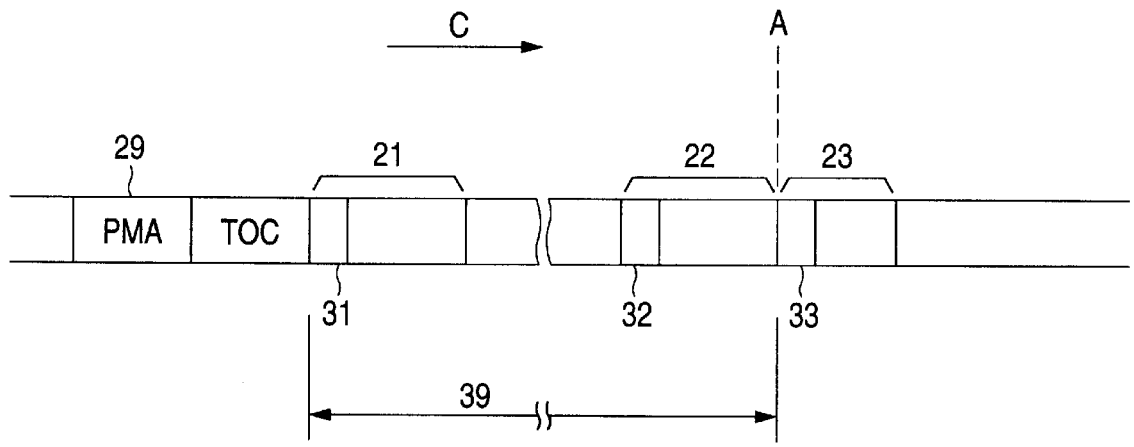
FIG. 2 is a diagram illustrating the data structure of an optical disk.

FIG. 2 is a diagram illustrating the state of tracks written to the optical disk 1; an arrow C in FIG. 2 indicates a direction directed from the inner periphery to the outer periphery.

Tracks 21, . . . , 22 written to an area 39 indicate a group of tracks which are closed as a file. Further, PMA 29 represents an address information area. In other words, start and end addresses of the respective tracks 21, . . . , 22 are registered in the PMA 29. An address A is the final value of the addresses (final address) registered in the PMA 29. A track 23 starting from an address next to the final address A is a track where the writing of data has been interrupted, and is invisible data whose address is not registered in the PMA 29. Further, track descriptor blocks (hereinafter referred to as "TDB") indicating methods of writing data on the corresponding tracks 21, . . . , 22, 23, track numbers and the like are registered in pregap portions 31, . . . , 32, 33 provided in the head portions of the respective tracks 21, . . . , 22, 23.

As shown in FIG. 1 again, a pickup 2 is a block comprising a laser light emitting element, a light receiving element for receiving the laser light reflected from the optical disk 1, and an optical element such as a condenser lens and used for writing data to the optical disk 1. Further, the pickup 2 is also used for reading the data written to the optical disk 1.

An R/W circuit 3 is a block for supplying a write signal to the pickup 2 when data is written thereto and for amplifying and waveform-shaping the output of the pickup 2 and the like when data is read. The R/W circuit 3 is also used for supplying a tracking error signal, a focus error signal and the like from the pickup 2 to a pickup control section 10.

A signal processing circuit 4 is a block for subjecting the data led via a signal line 12 to a predetermined encoding process when the data is written and feeding the write data obtained by the encoding process to the R/W circuit 3. Further, the signal processing circuit 4 is used for subjecting the signal output from the R/W circuit 3 to a predetermined decoding process when data is read and for outputting the data obtained by the decoding process to the outside via a signal line 13. The signal processing circuit 4 is also used for feeding the data obtained by the decoding process to a TDB read section 5, a determination section 7 and a main control section 9.

The TDB read section 5 is a block for reading the write method indicated by the TDB positioned on the outermost peripheral side of the optical disk 1 thus mounted when power has been supplied or when the optical disk 1 has been replaced. In other words, the TDB read section 5 is used for reading the TDB in the pregap portion 33 starting from the address next to the final address A when the main control section 9 indicates that power has been supplied or that the optical disk 1 has been replaced and when the determination section 7 indicates that the optical disk 1 is writable. Further, the TDB read section 5 sends out the write method and the track number indicated by the read TDB to a TDB storage section 6.

However, in the case where the mounted optical disk 1 is a disk having no invisible data 23, the pregap portion 33 on the outer peripheral side further than the final address A is not written. Therefore, the TDB read section 5 reads the TDB in the pregap portion 32 of the final track 22 registered in the PMA 29 when no TDB is detected on the outer peripheral side further than the final address A. Then, the TDB read section 5 sends out the write method and the track number indicated by the read TDB to the TDB storage section 6.

The TDB storage section 6 is a block for storing the write method, the track number and the like read by the TDB read section 5 and for sending the write method and the track number thus stored to the main control section 9.

The determination section 7 is a block for determining whether the optical disk 1 is writable from predetermined information of the data output from the signal processing circuit 4. In other words, the determination section 7 is used for determining whether the optical disk 1 is a writable optical disk such as a CD-R, a CD-RW and so on or an unwritable CD-ROM and for supplying the result thus determined to the TDB read section 5 and the main control section 9.

The pickup control section 10 is a block for effecting the tracking and focusing control of the pickup 2. In addition, the pickup control section 10 is also used for controlling the movement of the pickup 2 to a track designated by the main control section 9.

The main control section 9 is a block for controlling the principal operation of the optical disk device, that is, switching the operation of the R/W circuit 3 and that of the signal processing circuit 4 over the write or read operation. When instructed to write data to the optical disk 1, the main control section 9 examines whether the designated write method conforms to what has been stored in the TDB storage section 6. When both methods conform to each other, the main control section 9 causes data to be written to the optical disk 1 but when both methods do not conform to each other, it does not cause data to be written thereto (the write operation will be discussed in detail later). Further, the main control section 9 detects beforehand the address of a frame next to the frame on the outermost peripheral side to which data has been written and stores that frame address as a new writable address (hereinafter referred to as "NWA") at the time of performing the initial setting operation after power is supplied or the optical disk 1 is replaced.

Figure 3:
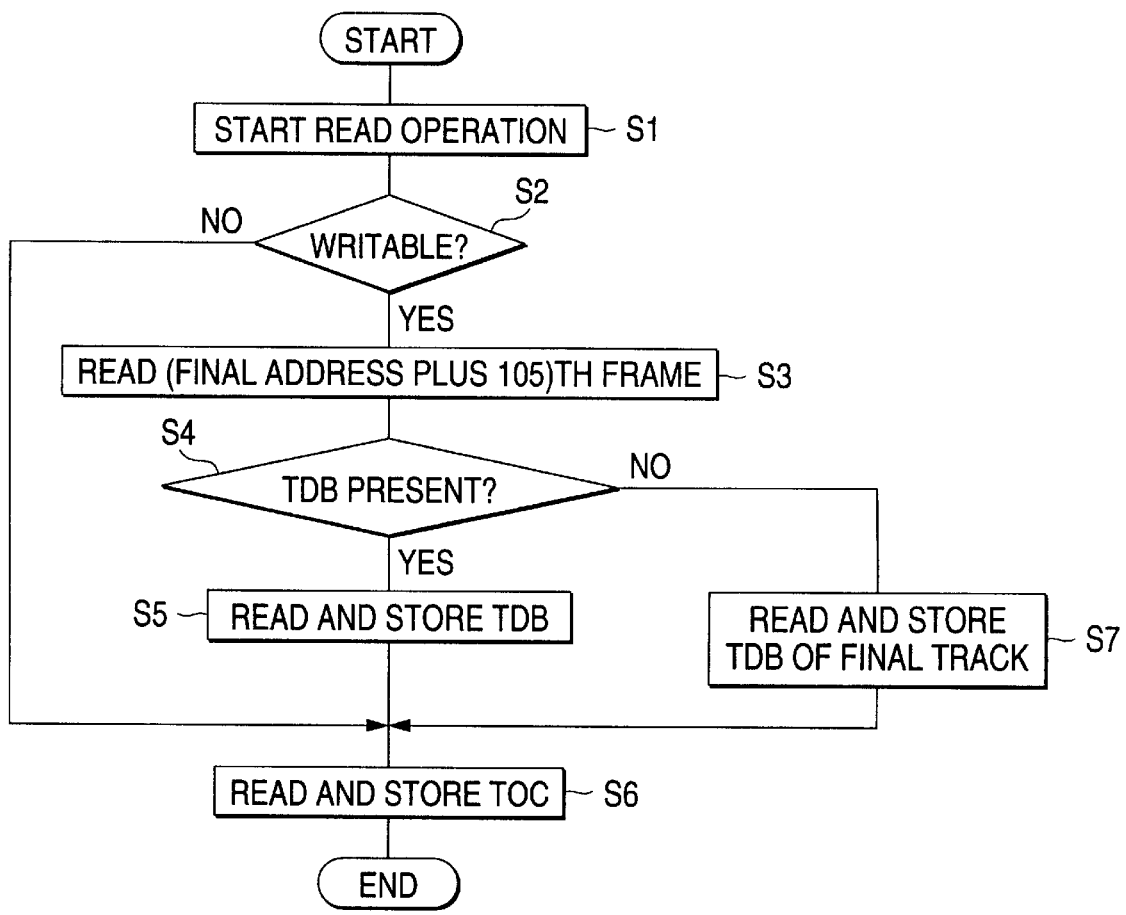
FIG. 3 is a flowchart showing the initial setting operation when power is supplied or when the optical disk is replaced.
Figure 4:
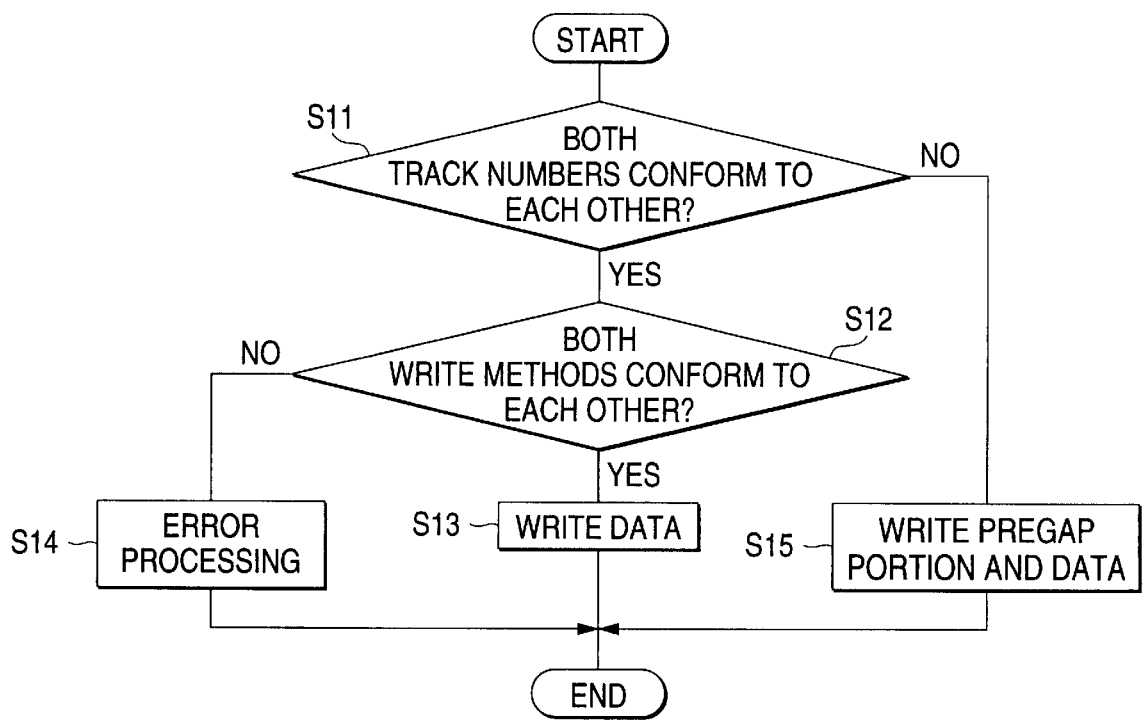
FIG. 4 is a flowchart showing the operation of writing data to the optical disk.

FIG. 3 is a flowchart showing the initial setting operation with the replacement of the optical disk 1, and FIG. 4 is a flowchart showing the data write operation. Referring to FIGS. 3 and 4 as required, the operation of this embodiment will be described.

It is now assumed that power is supplied or the optical disk 1 is replaced, that the optical disk 1 thus replaced is a CD-R or a CD-RW and that the tracks 21, . . . , 22 closed as a file have already been written to the area 39 of the replaced optical disk 1 and simultaneously with the track (invisible data) 23 not closed as a file being written thereto.

When the optical disk 1 is the aforesaid optical disk, the main control section 9 makes certain of the presence of the mounted optical disk 1 by means of a tray switch (not shown). Then, the main control section 9 controls the rotation of a spindle motor 11. When the main control section 9 detects that the spindle motor 11 is rotating at a predetermined speed, it instructs the R/W circuit 3 and the signal processing circuit 4 to start the read operation (Step S1).

Consequently, information indicating the disk type recorded on the optical disk 1 is sent out to the determination section 7 via the pickup 2, the R/W circuit 3 and the signal processing circuit 4. The determination section 7 determines according to the given information whether the optical disk 1 is a writable optical disk (CD-R or CD-RW) or a read-only optical disk (CD-ROM). Since the optical disk 1 in question is writable at this time, the determination section 7 informs the TDB read section 5 and the main control section 9 that it is writable (Step S2).

The main control section 9 that has received the information about the writable optical disk 1 performs control so as to read the PMA 29. In consequence, the information stored in the PMA 29 is led to the TDB read section 5. The TDB read section 5 reads the final address A from the information in the PMA 29 and an address positioned on the outer peripheral side from the read final address A by 105 frames. At this address, the pregap portion 33 having TDB is recorded. Therefore, the TDB read section 5 reads the TDB of the pregap portion 33 as TDB positioned on the outermost peripheral side. Then, the TDB read section 5 sends out the write method and the track number indicated by the read TDB to the TDB storage section 6. The TDB storage section 6 stores the write method and the track number supplied from the TDB read section 5 (Steps S3 to S5). Further, the main control section 9 obtains the address of a frame next to the final frame of the invisible data 23 and stores the address thus obtained as the NWA. The main control section 9 performs control so as to read TOC and stores the read TOC information therein (Step S6). Then, the main control section 9 informs the outside that the write or read instruction is acceptable.

Now assuming that the optical disk 1 thus mounted is an optical disk to which the invisible data 23 has not been written, the pregap portion 33 is not recorded at the address positioned on the outer peripheral side from the final address A by 105 frames in this case. Therefore, the TDB read section 5 is unable to detect the TDB even when it reads the address positioned on the outer peripheral side from the final address A by 105 frames. Consequently, the operation is moved from Step S4 to Step S7 and the TDB read section 5 reads the TDB of the pregap portion 32 of the final track 22 and sends out the write method and the track number indicated by the read TDB to the TDB storage section 6. The TDB storage section 6 stores the write method and the track number supplied from the TDB read section 5. Further, the main control section 9 stores the address of the frame next to the final address A as the NWA. The main control section 9 also performs control so as to read the TOC and stores the read TOC information therein (Step S6). Then, the main control section 9 informs the outside that the write or read instruction is acceptable.

Assuming that the mounted optical disk 1 is a CD-ROM, data indicating information about the kind of the optical disk 1 indicates that the optical disk 1 is a read-only optical disk. Therefore, the determination section 7 informs the main control section 9 and the TDB read section 5 that the optical disk 1 is unwritable (i.e., CD-ROM). Consequently, a series of operations (Steps S3 to S5 and S7), for example, the operation of reading the TDB and seeking the NWA, are omitted and the operation of reading the TOC information is immediately carried out (Step S6). Then, the main control section 9 informs the outside that the read instruction is acceptable. Therefore, the initial setting operation time after power is supplied or the optical disk 1 is replaced is shortened in time when the optical disk 1 thus replaced is a read-only disk.

The operation of writing data will be described on the assumption that the optical disk 1 is an optical disk to which the invisible data 23 has been written.

The write method to the track 23 and the track number are stored in the TDB storage section 6. When the write instruction is given from the outside, the main control section 9 checks whether the track number under the write instruction conforms to the track number stored in the TDB storage section 6 (Step S11). When both the track numbers conform to each other, the main control section 9 further checks the write method under the instruction conforms to the write method stored in the TDB storage section 6 (Step S12). When both write methods conform to each other, the main control section 9 controls the R/W circuit 3 and the signal processing circuit 4 so as to write the data led via the signal line 12 to the optical disk 1 with the predetected NWA as a starting address (Step S13). However, when both write methods do not conform to each other at Step S12, the main control section 9 informs the outside that the write instruction is incorrect (Step S14).

The operation of writing data will subsequently be described on the assumption that the optical disk 1 is an optical disk to which the invisible data 23 has not been written and the track 22 is an incomplete track.

The write method to the track 22 and the track number are stored in the TDB storage section 6. When the write instruction is given from the outside, the main control section 9 checks whether the track number under the write instruction conforms to the track number stored in the TDB storage section 6 (Step S11). When both the track numbers conform to each other, the main control section 9 further checks the write method under the instruction conforms to the write method stored in the TDB storage section 6 (Step S12). When both write methods conform to each other, the main control section 9 controls the R/W circuit 3 and the signal processing circuit 4 so as to write data to the optical disk 1 (Step S13). On the other hand, when both write methods do not conform to each other at Step S12, the main control section 9 informs the outside that the write instruction is incorrect (Step S14).

On the other hand, when the track number under the write instruction is the number of a track next to the track 22 (the number of track 23), the operation proceeds from Step S11 to Step S15. Consequently, the main control section 9 newly prepares a track 23 on the optical disk 1 and writes data to the prepared track 23 in the instructed write method. The main control section 9 also writes the pregap portion 33 having TDB indicating the instructed write method and track number to the head portion of the track 23.

The present invention is not limited to the aforementioned embodiment thereof but may also be applicable to an optical disk such as a DVD though a description has been given of the case where the optical disk 1 is a CD-R or a CD-RW.

The optical disk device according to the present invention includes the TDB read section for reading a write method indicated by the track descriptor block positioned on the outermost peripheral side of the optical disk thus mounted when power is supplied or the optical disk is replaced, and the TDB storage section for storing the write method read by the TDB read section. When data is instructed to be written to the optical disk, the data is written to the optical disk when the write method thus instructed conforms to the write method stored in the TDB storage section. In other words, only the write method indicated by the track descriptor block positioned on the outermost peripheral side of the optical disk thus mounted is read and stored beforehand and when data is written, it is determined whether the write method is consistent on the basis of the write method thus read out. Therefore, the optical disk device is capable of shortening the time required for initial setting when write speed is prevented from lowering as viewed from the outside of the device.

What is claimed is:

1. An optical disk device for writing data to an optical disk having a pregap portion disposed in a head portion of a track to which a track descriptor block indicating a method of writing data to the track is recorded, said optical disk device comprising:

a TDB read section for reading a write method indicated by a track descriptor block positioned on an outermost peripheral side of the optical disk thus mounted when power is supplied or the optical disk is replaced; and a TDB storage section for storing the write method read by said TDB read section, wherein when data is instructed to be written to the optical disk, it is checked whether the write method thus instructed conforms to the write method stored in said TDB storage section, and wherein the data is written to the optical disk when both write methods conform to each other and no data is written to the optical disk when both write methods do not conform to each other.

2. The optical disk device as claimed in claim 1, wherein data is written to an optical disk to which invisible data is permitted to be written, the invisible data whose recording address is not registered in an address information area in which recording address of written data is registered, and wherein said TDB read section is adapted to read the write method indicated by the track descriptor block of the pregap portion starting from an address next to a final address recorded in the address information area.

3. The optical disk device as claimed in claim 2, wherein said TDB read section is adapted to read the write method indicated by the track descriptor block of a final track registered in the address information area when the absence of a track descriptor block on the outer peripheral side further than the final address registered in the address information area is detected, and wherein when data is instructed to be written to the final track, it is checked whether the write method thus instructed conforms to the write method stored in said TDB storage section, and wherein data is written to the optical disk when both write methods conform to each other and no data is written to the optical disk when both write methods do not conform to each other.

4. The optical disk device as claimed in claim 1, further comprising a determination section for determining whether the optical disk thus mounted is a writable optical disk, wherein when said determination section determines that the optical disk thus mounted is a writable optical disk, said TDB read section is adapted to read the write method indicated by the track descriptor block, and when said determination section determines that the optical disk is not a writable optical disk, said TDB read section is adapted not to read the write method indicated by the track descriptor block.

* * * * *